US007001463B2

(12) United States Patent
Jones

(10) Patent No.: US 7,001,463 B2
(45) Date of Patent: Feb. 21, 2006

(54) POLISH COMPOSITIONS

(75) Inventor: Christopher Lloyd Jones, Marlow (GB)

(73) Assignee: Reckitt Benckiser (UK) Limited, Slough Berkshire (GB)

( * ) Notice: Subject to any disclaimer, the term of this patent is extended or adjusted under 35 U.S.C. 154(b) by 0 days.

(21) Appl. No.: 10/399,285

(22) PCT Filed: Oct. 18, 2001

(86) PCT No.: PCT/GB01/04652

§ 371 (c)(1),
(2), (4) Date: Sep. 10, 2003

(87) PCT Pub. No.: WO02/33015

PCT Pub. Date: Apr. 25, 2002

(65) Prior Publication Data

US 2004/0035317 A1 Feb. 26, 2004

(30) Foreign Application Priority Data

Oct. 20, 2000 (GB) ................................ 0025717.0

(51) Int. Cl.
*C09D 183/04* (2006.01)
*B05B 7/00* (2006.01)

(52) U.S. Cl. ............................ 118/300; 106/3; 106/11; 106/287.13; 525/477; 524/588

(58) Field of Classification Search ................ 524/837; 528/31, 37
See application file for complete search history.

(56) References Cited

U.S. PATENT DOCUMENTS

| | | | | |
|---|---|---|---|---|
| 4,936,914 A | | 6/1990 | Hurley et al. | 106/3 |
| 5,261,951 A | * | 11/1993 | Sejpka et al. | 106/3 |
| 5,380,527 A | * | 1/1995 | Legrow et al. | 424/401 |
| 5,783,719 A | * | 7/1998 | Sun et al. | 556/455 |
| 5,959,056 A | * | 9/1999 | Beach et al. | 528/15 |
| 6,562,114 B1 | * | 5/2003 | Yeiser et al. | 106/10 |
| 2005/0143282 A1 | * | 6/2005 | Creutz e al. | 512/4 |

FOREIGN PATENT DOCUMENTS

| | | | |
|---|---|---|---|
| EP | 0 548 789 A1 | | 12/1992 |
| GB | 1403512 | | 1/1974 |
| JP | 11315009 A | * | 11/1999 |
| WO | 92 00288 | | 1/1992 |
| WO | WO 92/00288 | | 1/1992 |
| WO | WO 94/05731 | | 3/1994 |
| WO | WO 9405731 A1 | * | 3/1994 |

OTHER PUBLICATIONS

GB0025717.0 search report dated Mar. 13, 2001.
PCT International Search Report, dated Jan. 10, 2002, for PCT/GB01/04652.

* cited by examiner

*Primary Examiner*—Marc Zimmer
(74) *Attorney, Agent, or Firm*—Norris, McLaughlin & Marcus

(57) ABSTRACT

A polish composition includes a siloxane polymer of the formula (III)

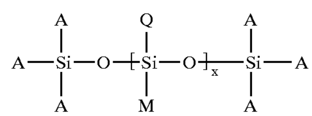

wherein each group A independently represents an alkyl group having up to 6 carbon atoms, M represents an alkyl group having up to 6 carbon atoms and Q represents an alkyl group, wherein a proportion of the groups Q have more than 20 carbon atoms and the remainder have up to 6 carbon atoms, and wherein "x" is an integer selected to give a molecular weight of the polymer III in the range 3,000–30,000. In prior polish compositions the radical "Q" have been of shorter chain lengths. We have found that a longer chain length promotes reduced smearing.

14 Claims, No Drawings

POLISH COMPOSITIONS

This invention relates to compositions for polishing smooth surfaces, for example ceramic tiles, wooden or metal surfaces, including furniture surfaces, leather, including shoes and boots, and plastics.

In U.S. Pat. No. 4,936,914 there are disclosed emulsion polish compositions comprising a copolymeric siloxane selected from the group consisting of a poly(dimethyl)-co-poly(methylalkyl) siloxane polymer, a poly(dimethyl)-co-poly(methyl, oxygen-containing) siloxane polymer, and combinations thereof. The poly(dimethyl)-co-poly(methylalkyl) siloxane copolymer has the formula (I)

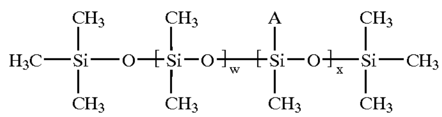

wherein "A" is an alkyl radical having 10–20 carbon atoms, and wherein "w" is 70–91 mol % and "x" is 9–30 mol %. The poly(dimethyl)-co-poly(methyl, oxygen-containing) siloxane copolymer has the formula (II)

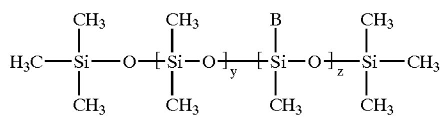

wherein "B" is $(CH_2)_i(L)(CH_2CH_2O)_nR$, wherein "i" is an integer from 3 to 10 inclusive, wherein "L" is either —O— or —COO—, wherein "n" is either zero or an integer from 1 to 3 inclusive, wherein "R" is —H, —$CH_3$, or —$C_2H_5$, and wherein "y" is 62–ρmol percent and "z" is 8–38 mol percent.

We have evaluated the poly(dimethyl)-co-poly(methylalkyl) siloxane polymers (I) defined above in certain polish compositions but have found them to contribute to smearing problems. Firstly, the compositions smear more readily on application than is desirable; and secondly, the smearing does not disappear readily and quickly. This is in spite of the fact that in U.S. Pat. No. 4,936,914 it is stated to be an object of the invention to produce compositions with "rapid smear-recovery properties".

Surprisingly, we have found that polish compositions containing poly(dimethyl)-co-poly(methylalkyl) siloxane copolymers similar to those defined as (I) above but having a longer alkyl radical A smear less readily or not at all; but if they do smear, exhibit better smear-recovery properties.

In accordance with a first aspect of the present invention there is provided a polish composition comprising a siloxane polymer of the formula (III)

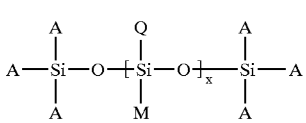

wherein each group A independently represents an alkyl group having up to 6 carbon atoms, M represents an alkyl group having up to 6 carbon atoms and Q represents an alkyl group, wherein a proportion of the groups Q have more than 20 carbon atoms and the remainder have up to 6 carbon atoms, and wherein "x" is an integer selected to give a molecular weight of the polymer III in the range 3,000–30,000.

Preferably the longer chain groups Q have 21–40 carbon atoms, more preferably 21–36 carbon atoms, and most preferably 24–32 carbon atoms.

Preferably a group A is a methyl group.

Preferably a group M is a methyl group.

Preferably the shorter chain alkyl groups Q are methyl groups.

Preferably all groups A, M and Q are methyl groups, other than the longer chain alkyl groups Q.

Preferably the molecular weight of the compound III is in the range 5,000–20,000, especially 6,000–12,000.

In one embodiment of the invention the compound of formula III is in accordance with the following definition:

(IIIA)

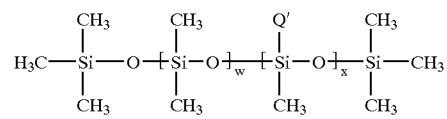

where Q' is a longer chain alkyl group as defined above, w is 5–95 mol % and x is 95–5 mol %. Preferably w is 50–95 mol %, especially 70–91 mol %. Preferably x is 5–50 mol %, especially 9–30 mol %.

Suitably the polymer of general formula III constitutes up to 50% of the polish composition, preferably up to 30%, more preferably up to 20%, and most preferably up to 10%, by weight (all percentages in this specification are by weight on total weight of the polish composition, unless otherwise stated). Especially preferred is up to 5%.

Suitably the polymer of formula III constitutes at least 0.05% of the polish composition, preferably at least 0.1%, more preferably at least 0.14%, and most preferably at least 0.18%.

Suitably the polish composition contains, in addition to the polysiloxane of general formula III, a poly(di-$C_{1-6}$ alkyl) siloxane oil. Preferred is a poly(dimethyl) siloxane oil. Preferably such a siloxane oil, when present, has a viscosity not exceeding 30,000 centipoids, preferably not exceeding 1,000 centipoids. Preferably the viscosity is between 10 and 350 centipoids. Suitably such a siloxane oil, when present, is present in an amount up to 10%, preferably up to 5%. Preferably a siloxane oil, when present, is present in an amount of at least 0.1%, preferably at least 0.5%, more preferably at least 1%, most preferably at least 2%.

Preferably the polish composition further comprises a surfactant, and/or water, and/or an organic solvent, preferably a hydrocarbon solvent.

A surfactant may be present in an amount up to 15% of the polish composition, preferably up to 10%, more preferably up to 5%. A surfactant may be present in an amount of at least 0.1%, preferably at least 0.2%.

A surfactant used in the present invention may be selected from one or more surfactants which may be anionic, cationic, nonionic, amphoteric or zwitteronic surface active agents.

One class of nonionic surfactants which may be used in the present invention are alkoxylated alcohols, particularly alkoxylated fatty alcohols. These include ethoxylated and propoxylated fatty alcohols, as well as ethoxylated and propoxylated alkyl phenols, both having alkyl groups of from 7 to 16, more preferably 8 to 13 carbon chains in length.

Examples of alkoxylated alcohols include certain ethoxylated alcohol compositions presently commercially available from the Shell Company, (Houston, Tex.) under the general trade name NEODOL (trade mark), which are described as linear alcohol ethoxylates and certain compositions presently commercially available from the Union Carbide Company, (Danbury, Conn.) under the general trade name TERGITOL (trade mark), which are described as secondary alcohol ethoxylates.

Examples of alkoxylated alkyl phenols include certain compositions presently commercially available from the Rhône-Poulenc Company (Cranbury, N.J.) under the general trade name IGEPAL (trade mark), which are described as octyl and nonyl phenols.

Preferred surfactants for use in the present invention are surfactants which function as emulsifiers. Especially preferred is sorbitan mono-oleate.

Examples of anionic surface active agents which may be used in the present invention include but are not limited to: alkali metal salts, ammonium salts, amine salts, aminoalcohol salts or the magnesium salts of one or more of the following compounds: alkyl sulphates, alkyl ether sulphates, alkylamidoether sulphates, alkylaryl polyether sulphates, monoglyceride sulphates, alkylsulphonates, alkylamide sulphonates, alkylarylsulphonates, olefinsulphonates, paraffin sulphonates, alkyl sulfosuccinates, alkyl ether sulfosuccinates, alkylamide sulfosuccinates, alkyl sulfosuccinamate, alkyl sulfoacetates, alkyl phosphates, alkyl ether phosphates, acyl sarconsinates, acyl isothionates and N-acyl taurates. Generally, the alkyl or acyl group in these various compounds comprises a carbon chain containing 12 to 20 carbon atoms.

Other anionic surface active agents which may be used include fatty acid salts, including salts of oleic, ricinoleic, palmitic and stearic acids; copra oils or hydrogenated copra oil acid, and acyl lactylates whose acyl group contains 8 to 20 carbon atoms.

Amphoteric surfactants which may be used in the present invention including amphoteric betaine surfactant compounds having the following general formula:

$$R - \overset{(+)}{N}(R_1)_2 - R_2\overset{(-)}{COO}$$

wherein R is a hydrophobic group which is an alkyl group containing from 10 to 22 carbon atoms, preferably from 12 to 18 carbon atoms, an alkylaryl or arylalkyl group containing a similar number of carbon atoms with a benzene ring being treated as equivalent to about 2 carbon atoms, and similar structures interrupted by amido or either linkages; each $R_1$ is an alkyl group containing from 1 to 3 carbon atoms; and $R_2$ is an alkylene group containing from 1 to 6 carbon atoms.

One or more such betaine compounds may be included in the compositions of the invention.

A mixture of two or more surface active agents may also be used. Other known surface active agents not particularly described above may also be used. Such surface active agents are described in McCutcheon's Detergents and Emulsifiers, North American Edition, 1982; Kirk-Othmer, Encyclopaedia of Chemical Technology, 3rd Ed., Vol. 22, pp 346–387.

Preferred surfactants for use in this invention are anionic surfactants and/or non-ionic surfactants, especially non-ionic surfactants, particularly those having emulsification properties.

The polish compositions of the invention may optionally include one or more conventional additives known to be useful in polish compositions, including viscosity modification agents, fragrances (natural or synthetically produced), foaming agents, water softening agents, corrosion inhibitors, preservatives, solvents and colouring agents. Waxes may also be included, for example selected from beeswax, montanic wax, microcrystalline wax, paraffinic wax, camauba wax and candellila wax. Such optional constituents should be selected so to have little or no detrimental effect upon the polishing efficacy of the compositions, and possibly a beneficial effect (in the case, for example, of waxes). Generally the total weight of such additives may comprise up to 40% by weight of the composition, but preferably less, for example up to 20%, more preferably up to 10%, and most preferably up to 5%.

Water may be present in an amount up to 99%, depending on the amount of other components. Suitably water may be present in an amount in the range 2–99%, preferably 40–95%, most preferably 65–90%.

An organic solvent may suitably be a lower alkyl alcohol, lower alkyl diol, glycol ether, paraffinic or isoparaffinic solvent. By "lower" we mean having up to 6 carbon atoms.

An organic solvent is suitably present in an amount at least 0.15%, preferably at least 2%, most preferably at least 5%. It is suitably present in an amount up to 90%, preferably up to 50%, most preferably up to 20%.

Preferably the polish composition is an emulsion. Preferably it is a water-in-oil emulsion.

Thus, a preferred polish composition is a liquid which comprises:

0.1–50% of a compound of formula III;
0.1–10% surfactant;
0.15–90% organic solvent;
0.1–10% poly(di-$C_{1-6}$ alkyl)siloxane oil;
0–50% additional components;
balance water.

A more preferred polish composition is a liquid which comprises:

0.1–5% of a compound of formula III;
0.2–2% surfactant;
0.5–20% hydrocarbon solvent;
1–5% poly(di-$C_{1-6}$ alkyl)siloxane oil;
0–5% additional components;
balance water.

Any of the compositions of the invention may be provided in containers which are squeezable or pumpable to express their contents. Preferred examples are those which express their contents as a spray. A trigger spray is a preferred example of a suitable container.

Alternatively, any of the above compositions may be provided in aerosol containers. The compositions defined above may additionally contain a propellant (in addition to said organic solvent). The propellant may suitably be an alkane propellant, for example a lower alkane, suitably n-propane and/or n-butane. When a propellant is present it is suitably present in an amount up to 100%, preferably up to 50%, by weight, on total weight of the remainder of the composition. Percentages of ingredients are expressed herein with reference to the total weight of such compositions without the propellant.

In accordance with a second aspect of the present invention there is provided a container containing a polish composition of the invention as described herein, the container being provided with a spray emission means.

Preferably the viscosity of a liquid polish composition of the invention is in the range 50–5,000 centipoids, more preferably 100–600 centipoids.

In accordance with a further aspect of the present invention there is provided a method of polishing a smooth hard, preferably shinable, surface, the method comprising the steps of applying a polish composition as defined above to the surface, and rubbing the surface with a cloth.

Compositions of the invention may be prepared by blending the components together. In some embodiments it may be necessary to heat the compound of formula III in the organic solvent to obtain complete dissolution. When certain waxes are to be present they may suitably be heated in the water to emulsify them prior to mixing with other ingredients.

The invention will now be further described, by way of example, with reference to the following examples.

EXAMPLE 1

An aerosol formulation as set out in the table below was made up by homogenising the ingredients together. The DC 5929 siloxane had first been dissolved in Exxsol D145/160 solvent by warming to 70° C. The Licowax Kle had first been emulsified by heating in water.

| Name | Supplier | wt % & (function) | Chemical ref. etc. |
|---|---|---|---|
| Water | N/A | 66.1515 (Solvent) | |
| Sodium benzoate | Surfachem | 0.0085 (Antioxidant) | |
| Licowax Kle | Clariant | 0.34 (Wax) | Emulsifier containing montanic esters CAS No [73138-45-1] [68920-66-1] |
| Mergal K7 | Surfachem | 0.085 (Preservative) | CAS No 26172-55-4 |
| Exxsol D145/160 | Exxon | 14.521 (Solvent) | Isoparaffinic solvent, bp 145–160° C. |
| Silicone Oil (350) | Dow Corning | 2.72 (Silicone) | Poly(dimethyl)-siloxane—see below |
| Sorbitan monooleate | Croda | 0.7 (Emulsifier) | Non-ionic surfactant |
| BBA Cascata | BBA | 0.29 (Fragrance) | |
| DC 5929 | Dow Corning | 0.184 (Silicone copolymer) | See below |
| Butane 40 | BP | 15.0 (Propellant) | A mixture of n-butane, i-butane and n-propane to give a pressure of 40 psi ($2.7 \times 10^4$ Pa) |

DC 5929 is believed to be a poly(dimethyl)-co-poly (methylalkyl) siloxane, and is available from Dow Corning. It is believed to be in accordance with formula IIIA above, wherein "$Q^1$" is an alkyl radical having 30 carbon atoms, "w" is believed to be 9 mol % and "x" is believed to be 91 mol %, not including end groups. The molecular weight is believed to be in the range 7676 to 9988.

The poly(dimethyl) siloxane oil used is believed to have the formula

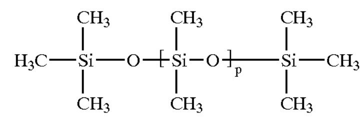

where p is such that the viscosity is 350 centipoids.

Mergal K7 is a preservative believed to have the formula 5-chloro-2-methyl-2,3-dihydroisothiazol-3-one.

On testing as a furniture polish the composition was found to have a very low propensity to smearing, and to exhibit rapid smear recovery, in the unusual event of smearing.

EXAMPLE 2

The ingredients mentioned in the table below were blended together to make a water-in-oil emulsion. Prior to blending the DC 5929 siloxane and the Licowax Kle with the other ingredients they were dissolved respectively in the Exxsol D145/160 and water, under gentle heating.

| Ingredients | Wt % |
|---|---|
| DC 5929 | 0.2 |
| Poly(dimethyl)siloxane oil | 3.2 |
| Exxsol D145/160 | 17.3 |
| Mergal K7 | 0.1 |
| Sorbitan mono-oleate | 0.8 |
| Licowax Kle | 0.2 |
| Fragrance | 0.2 |
| Water | 78.0 |

The formulation of Example 2 is suitable for dispensing from a pumpable container, for example a trigger spray.

Comparative Testing

To investigate smear-recovery and degree of smearing upon application of emulsion polish compositions obtained from utilising the copolymeric siloxane of the present invention, certain comparative smear tests were performed. The results of these clearly show the relative decrease in overall smear provided by the copolymeric siloxanes described in the prior art. The comparative smear tests were conducted using the method described below.

Materials Used:

| | |
|---|---|
| a) Black Vitriolite tiles | size 30 cms × 30 cms |
| b) Cotton dusters | general household dusters |
| c) Rubbing block | |
| d) Balance | |
| e) Formulations to be evaluated | |

Procedure

Preparation of the Tiles

1. Fold a duster around the rubbing block
2. Spray 0.5 g of polish onto the top edge of the duster
3. Apply the product to the tile, via the duster, by wiping down the centre of the tile five times in one motion with even pressure.
4. Wrap a clean duster around the rubbing block and buff the polished area in an up and down motion five times.

Evaluation of the Tiles

1. Invite a panel of 10 people to score the centre of the tile for smearing/non-smearing using the following scoring system:

| | |
|---|---|
| Sever smearing | score 4 |
| Bad smearing | score 3 |
| Moderate smearing | score 2 |
| Slight smearing | score 1 |
| No smearing | score 0 |

2. Calculate average score for each sample tested.
3. Rank average results in ascending order.
4. Compare results. Samples with the lowest score indicate those which give the least or no smearing.

For a comparison a preferred copolymeric siloxane used in formulations described in U.S. Pat. No. 4,936,914 was employed and tested against the composition of Table 1 above. The formulation was the same, except that the DC 5929 was replaced by DC 2-5671, a Dow Corning compound in accordance with the formula I given above, wherein the "A" is believed to be an alkyl radical having 18 carbon atoms, "w" is believed to be 9 mol percent and "x" is believed to be 91 mol percent, not including end groups. The mean overall result is summarised below.

| Formulation | Smearing Score |
|---|---|
| Invention composition | 1.10 |
| Comparative composition | 1.44 |

The statistical outcome is that the composition of the invention containing the siloxane DC 5929 has significantly less tendency to smear than the corresponding compositions containing siloxane DC 2-5671, to a 95% degree of certainty. The statistical method that was used was analysis of variants.

EXAMPLE 3

A further test was carried out using the following formulation of the invention:

| Ingredients | Wt % |
|---|---|
| DC 5929 | 2.0 |
| Sorbitan mono-oleate | 1.0 |
| Exxsol D145/160 | 16.0 |
| Water | 81.0 |

A comparison was carried out using the following formulation:

| Ingredients | Wt % |
|---|---|
| DC 2-5671 | 2.0 |
| Sorbitan mono-oleate | 1.0 |
| Exxsol D145/160 | 16.0 |
| Water | 81.0 |

These are basic formulations, intended to enable comparisons to be made without the risk that smearing may be attributable to a further component. It is believed that tests for smearing using these formulations will largely look to the smearing properties of the siloxane materials themselves.

It was found in the tests, carried out by a method in accordance with the method of Example 2, that the formulation of the invention is significantly less smear-forming than the comparison formulation.

The invention claimed is:

1. A polish composition comprising a) from 0.1% to 5% of a siloxane polymer of the formula (III)

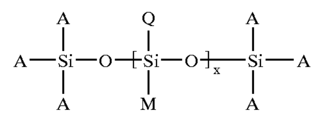

wherein each group A independently represents an alkyl group having up to 6 carbon atoms, M represents an alkyl group having up to 6 carbon atoms and Q represents an alkyl group, wherein a proportion of the groups Q have more than 20 carbon atoms and the remainder have up to 6 carbon atoms, and wherein "x" is an integer selected to give a molecular weight of the polymer III in the range 3,000–30,000;

b) from 0.2% to 2% surfactant;

c) from 0.5% to 20% hydrocarbon solvent;

d) from 1% to 5% poly(di-$C_{1-6}$ alkyl) siloxane oil;

e) 0 to 5% additional components; and f) balance water.

2. A polish composition as claimed in claim 1, wherein a proportion of the group Q have 24–32 carbon atoms.

3. A polish composition as claimed in claim 1 wherein the groups A, M and a proportion of the group Q are all methyl groups.

4. A polish composition as claimed in claim 2 wherein the groups A, M and wherein the proportion of the group Q which does not have 24–32 carbon atoms are methyl groups.

5. A polish composition according to claim 1, wherein the compound of formula III is in accordance with the following definition:

(IIIA)

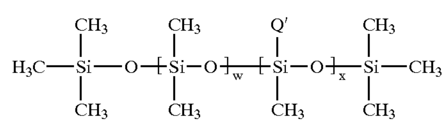

wherein

Q represents an alkyl group;

Q' is an alkyl group having more than 20 carbon atoms, w has a value which provides 5–95 mol % of the indicated group, and, x has a value which provides 95–5 mol % of the indicated group.

6. A polish composition as claimed in claim 1 wherein the additional components are selected from the group consisting of viscosity modification agents, fragrances, foaming agents, water softening agents, corrosion inhibitors, preservatives, solvents and coloring agents.

7. A container containing a liquid polish composition comprising from 0.1% to 5% of a siloxane polymer of the formula (III)

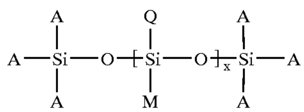

wherein each group A independently represents an alkyl group having up to 6 carbon atoms, M represents an alkyl group having up to 6 carbon atoms and Q represents an alkyl group, wherein a proportion of the groups Q have more than 20 carbon atoms and the remainder have up to 6 carbon atoms, and wherein "x"is an integer selected to give a molecular weight of the polymer III in the range 3,000–30,000, from 0.2% to 2% surfactant, from 0.5% to 20% hydrocarbon solvent, from 1 to 5% poly(di-$C_{1-6}$ alkyl) siloxane oil, 0 to 5% additional components and the balance water wherein the container includes spray emission means.

8. A container as claimed in claim 7, being a trigger spray container.

9. A container as claimed in claim 7, being an aerosol spray container, the container additionally containing a propellant.

10. A container as claimed in claim 7, wherein a proportion of the group Q of the siloxane polymer have 24–32 carbon atoms.

11. A container as claimed in claim 7 wherein the groups A, M and a proportion of the group Q of the siloxane polymer are all methyl groups.

12. A container as claimed in claim 10 wherein the groups A, M and wherein the proportion of the group Q which does not have 24–32 carbon atoms of the siloxane polymer are methyl groups.

13. A container according to claim 7, wherein the siloxane polymer of formula III is in accordance with the following definition:

(IIIA)

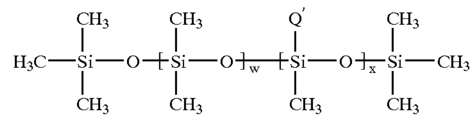

wherein

Q represents an alkyl group;

Q' is an alkyl group having more than 20 carbon atoms, w has a value which provides 5–95 mol % of the indicated group, and, x has a value which provides 95–5 mol % of the indicated group.

14. A method of polishing a smooth hard surface, the method comprising the step of applying a polish composition, comprising from 0.1% to 5% of a siloxane polymer having the formula:

(III)

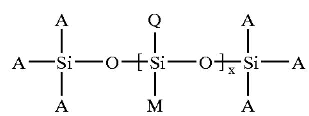

wherein each group A independently represents an alkyl group having up to 6 carbon atoms, M represents an alkyl group having up to 6 carbon atoms and Q represents an alkyl group, wherein a proportion of the groups Q have more than 20 carbon atoms and the remainder have up to 6 carbon atoms, and wherein "x"is an integer selected to give a molecular weight of the polymer III in the range 3,000–30,000, from 0.2% to 2% surfactant, from 0.5% to 20% hydrocarbon solvent from 1% to 5% poly siloxane oil, 0 to 5% additional components and the balance water and rubbing the surface with a cloth.

* * * * *

UNITED STATES PATENT AND TRADEMARK OFFICE

CERTIFICATE OF CORRECTION

PATENT NO. : 7,001,463 B2
APPLICATION NO. : 10/399285
DATED : February 21, 2006
INVENTOR(S) : Jones It is certified that error appears in the above-identified patent and that said Letters Patent is hereby corrected as shown below:

Column 9, line 22, “1” should read -- 1% --

Column 10, line 39, “from 1% to 5% poly siloxane oil” should read -- from 1% to 5% poly (di-$C_{1-6}$ alkyl) siloxane oil --

Signed and Sealed this

Twenty-fifth Day of November, 2008

JON W. DUDAS
*Director of the United States Patent and Trademark Office*